United States Patent [19]

Schnallinger

[11] Patent Number: 5,554,332
[45] Date of Patent: Sep. 10, 1996

[54] PROCESS OF MANUFACTURING SHAPED ELEMENTS FROM SYNTHETIC THERMOPOLASTICS

[76] Inventor: Helfried Schnallinger, Sarmingstein, A-4382 Sarmingstein 46, Austria

[21] Appl. No.: 424,316

[22] PCT Filed: Oct. 20, 1993

[86] PCT No.: PCT/AT93/00159

§ 371 Date: Apr. 12, 1995

§ 102(e) Date: Apr. 12, 1995

[87] PCT Pub. No.: WO94/08772

PCT Pub. Date: Apr. 28, 1994

[30] Foreign Application Priority Data

Oct. 21, 1992 [AT] Austria ................................ 2081/92

[51] Int. Cl.$^6$ .................................................. B29C 57/02
[52] U.S. Cl. ........................ 264/230; 264/296; 264/322; 264/342 R; 264/DIG. 66; 264/DIG. 71; 425/393
[58] Field of Search ................................. 264/230, 294, 264/900, 342 R, 342 RE, DIG. 71, 516, 566, 296, 322, DIG. 66, 573; 425/393, 392; 156/86

[56] References Cited

U.S. PATENT DOCUMENTS

| Re. 31,404 | 10/1983 | Anger | 264/318 |
|---|---|---|---|
| 2,860,372 | 11/1958 | Youthed | 425/393 |
| 3,249,671 | 5/1966 | Perrone | 264/342 R |
| 3,372,462 | 3/1968 | Reid et al. | 264/230 |
| 3,651,197 | 3/1972 | McKay | 264/230 |
| 3,691,617 | 9/1972 | Burnett | 29/423 |
| 3,804,567 | 4/1974 | Recknagel | |
| 3,929,958 | 12/1975 | Parmann | 264/249 |
| 3,959,424 | 5/1976 | Dawson et al. | 264/516 |
| 4,113,829 | 9/1978 | Bowker et al. | 264/295 |
| 4,135,961 | 1/1979 | Yoshizawa et al. | 425/392 |
| 4,482,518 | 11/1984 | Brady, Jr. | 264/900 |

FOREIGN PATENT DOCUMENTS

| 0081451 | 6/1983 | European Pat. Off. . |
|---|---|---|
| 0195591 | 9/1986 | European Pat. Off. . |
| 3603060 | 8/1976 | Germany . |
| 54-006079 | 1/1979 | Japan . |
| 62-211125 | 9/1987 | Japan . |

OTHER PUBLICATIONS

WO 85/03251, publ. Aug. 1, 1985.

*Primary Examiner*—Jeffery R. Thurlow
*Attorney, Agent, or Firm*—Collard & Roe, P.C.

[57] ABSTRACT

In a process of manufacturing shaped elements from synthetic thermoplastics, particularly polyolefins, such as polyethylene and polypropylene, wherein the plastic material is heated to a temperature above its softening temperature and is shaped in that state to form the shaped element and is subsequently cooled to a temperature below its softening temperature, the shaped elements are shaped in a hot state to form intermediate products having a certain oversize over the desired final dimensions and after they have been cooled are caused by a material-compacting pressing operation to assume the desired final dimensions, in which they are dimensionally stable.

3 Claims, No Drawings

PROCESS OF MANUFACTURING SHAPED ELEMENTS FROM SYNTHETIC THERMOPOLASTICS

BACKGROUND OF THE INVENTION

1. Field of the Invention

This invention relates to a process of manufacturing shaped elements from synthetic thermoplastics, particular polyolefins, such as polyethylene and polypropylene, wherein the plastic material is heated to a temperature above its softening temperature and is shaped in that state to form the shaped element and is subsequently cooled to a temperature below its softening temperature.

2. Description of the Prior Art

Numerous plastic parts which consist of a synthetic thermoplastic material and are made from the hot material by injection molding, extruding, compression molding or a different shaping operation tend to deform in the course of time and/or at temperatures above temperature limits which are far below the softening temperatures and under such conditions tend particularly to shrink, i.e., to decrease their outside dimensions relative to the dimensions of the element as made. For instance, tubular elements which are made of black polyethylene will after a certain time of outdoor storage exhibit a certain shrinkage, which maybe of an order of one or a few millimeters or percent of the initial diameter. Although the conventional manufacturing temperatures or softening temperatures of sockets lie in the range from 120° to 200° C. or for strict shaping operations are about 110° C. and black tubular elements are not heated to temperatures in excess of about 70° C. by solar irradiation, such shrinkages do actually occur in practice. This is undesired as regards the flow rate which can be achieved and is most inconvenient for the making of joints between tubular elements because conventional joints between sockets and spigots cannot be made satisfactorily if certain shrinkages have occurred and because sockets with which such tubular elements have integrally been formed will have after a shrinkage an inside diameter which is smaller than the outside diameter of the tubular elements which are to be joined. Usual manufacturing tolerances for the inside diameters of sockets are ±0.5 mm. Said tolerances are greatly exceeded by the above-mentioned shrinkages. Similar disadvantages will occur in connection with a large number of plastic parts, such as pipe fittings, which are made from polyolefins by hot-forming.

For making shrinkage-proof sockets it has previously been necessary to use expensive manufacturing processes. In one of said known processes the sockets are separately made in an injection molding machine and are subsequently welded by means of a separate device to an extruded tubular element. That process is highly expensive and results in a visible seam weld at the joint so that the risk of leakage is increased by an oxidation of the material and the socket may even become detached at the welded joint and because the socket made by injection molding may shrink, e.g., under solar irradiation, if certain materials have been used, so that an adequate safety will not be achieved. The same disadvantages are encountered in another known process, in which sockets are molded in a separate machine by means of an injection molding device onto the end of a tubular element. That practice will involve an even higher technical expenditure owing to the use of expensive machines and the tubular element and the socket will not constitute a homogeneous body.

The shrinking of certain plastics, particularly polyolefins, may be explained as follows:

Polyolefins have a crystalline structure and occur only in two physical states, namely, the solid and liquid states. When the plastic is heated, a part of the original molecules remain solid and the other part are liquefied so that a plastically deformable element is obtained, which can be shaped and deformed. The presence of those molecules which are not liquefied but remain solid gives rise to the so-called memory effect, which means that a shaped element made from a blank tends to return to its initial shape as soon as the molecules which have previously been liquefied and tend to maintain the shaped element in its current shape are heated or undergo a long-time shrinkage so that they permit the corresponding reverse deformation. It will be understood that the memory effect will also be influenced by the amount and nature of any possible fillers. The memory effect will also be observed in tubular elements made by extruding and will be particularly pronounced in expanded sockets and may be regarded as the main cause of the shrinking of tubular elements and sockets. Similar causes result in a shrinkage of other plastic parts made from the above-mentioned materials.

SUMMARY OF THE INVENTION

It is an object of the invention to provide a simple process by which undesired deviations of the final dimensions of manufactured plastic parts from the specified dimensions will reliably be prevented. A particularly interesting object is to render the process applicable to plastic tubular elements and expanded sockets of plastic tubular elements.

In accordance with the invention the shaped elements are shaped in a hot state to form intermediate products having a certain oversize over the desired final dimensions and after they have been cooled are caused by a material-compacting pressing operation to assume the desired final dimensions.

The main object set forth is satisfactorily accomplished by that simple measure. It will be understood that each process step must be adapted to the material and the processing conditions. Said processing conditions are, inter alia, the processing temperature, by which the amount of the remaining molecules is determined which give rise to the memory effect, also the kind of material and the thickness of the material, e.g., the wall thickness of tubular elements. Although the pressing operation will result in a compaction of a given shaped element care must be taken that the pressing operation will not give rise to cracks or fractures in the material. Because plastic parts are usually made by mass production, the operating conditions for the manufacture of each shaped element can be exactly determined by a few experiments.

On principle the process in accordance with the invention has the result that the shaped element which has been manufactured contains not only two different kinds of plastic molecules but three kinds thereof, namely, molecules which owing to the memory effect remember the initial shape of the shaped elements, molecules which had been liquid during the shaping and for this reason remember the larger dimensions of the shaped element after the final hot-forming, and, finally, molecules which remember the smallest shape which has been imparted to the shaped element during the pressing operation, which results in a deformation to a size which is smaller than the desired specified size. The balancing of the forces exerted by the molecules of said three groups will have the result that the shaped element assumes and is dimensionally stable in the desired final shape.

In an application of the general process to the manufacture of plastic tubular elements, the shaping station, which may consist of an extruding station, is designed to make a tubular element having a diameter which in dependence on the material is 0.5 to 5% in excess of the desired final diameter of the tubular element and the tubular elements which have been made in that shaping station and have been cooled are briefly compacted in a continuous operation in a pressing station to have a diameter which again in dependence on the material is 0.5 to 5% smaller than the desired final diameter so that they have the desired final diameter after the pressing operation.

Intermittently actuated pressing dies or rolls having annular grooves for receiving respective halves of the tubular elements may be used in the pressing station. If tubular elements relatively large in diameter are desired, it will be possible to use three or more pressing dies associated with corresponding fractional parts of the circumference of the tubular elements rather than two annular grooves for receiving respective halves of the tubular element.

The application of the process to the manufacture of sockets of plastic tubular elements is characterized in that the end of the tubular element is heated and expanded in known manner to form a socket having a diameter which in dependence on the material is 0.5 to 5% in excess of the desired final diameter and that the resulting socket is cooled and is subsequently compacted to have a diameter which is smaller than the desired final diameter so that said socket when it has been released by the pressing tool will undergo a partial elastic expansion to have the desired final diameter.

DETAILED DESCRIPTION OF THE PREFERRED EMBODIMENT

Illustrative Embodiment

Manufacture of a socket at a polyethylene tubular element having a wall thickness of 2 mm and an outside diameter of 125 mm.

The end of the tubular element is heated to a temperature of 120° C. and is subsequently expanded by means of an expanding mandrel to have an outside diameter of 131 mm. After cooling, the expanding mandrel is removed and the socket is compacted between two half-shell pressing dies, which define for the tubular element a diameter of 123 mm. When the socket has been released by the pressing dies, it has a diameter of 126 mm, which will be stable at temperatures up to 90° C.

As has been mentioned hereinbefore, the process in accordance with the invention can be applied not only to sockets and extruded tubular elements but also to other shaped elements which consist of plastic and have been made from hot material by injection molding, extruding, pressing or a different shaping operation and will shrink unless they are treated. In each case the shape and dimensions of the pressing tool must be adapted to the shaped element.

I claim:

1. A process of manufacturing a socket at an end of a tubular element of a thermoplastic synthetic material having a softening temperature, which comprises the steps of (a) heating the tubular element end to at least the softening temperature of the thermoplastic synthetic material to obtain a softened tubular element end, (b) shaping the softened tubular element end until the diameter of the tubular element end has been expanded to exceed a desired final diameter of the socket by 0.5% to 5%, depending on the thermoplastic synthetic material, (c) cooling the softened tubular element end after shaping to below the softening temperature, (d) subjecting the cooled tubular element end to compression to compact the thermoplastic synthetic material and until the diameter until is slightly smaller than the desired final diameter, and finally (e) releasing the compression to permit the tubular element end to expand to assume the desired final diameter of the socket.

2. The process of claim 1, wherein the thermoplastic synthetic material is a polyolefin.

3. The process of claim 2, wherein the polyolefin is polyethylene or polypropylene.

* * * * *